H. W. ALDEN & R. B. WEAVER.
TOOTHED WHEEL.
APPLICATION FILED MAR. 3, 1917.
1,231,321.
Patented June 26, 1917.
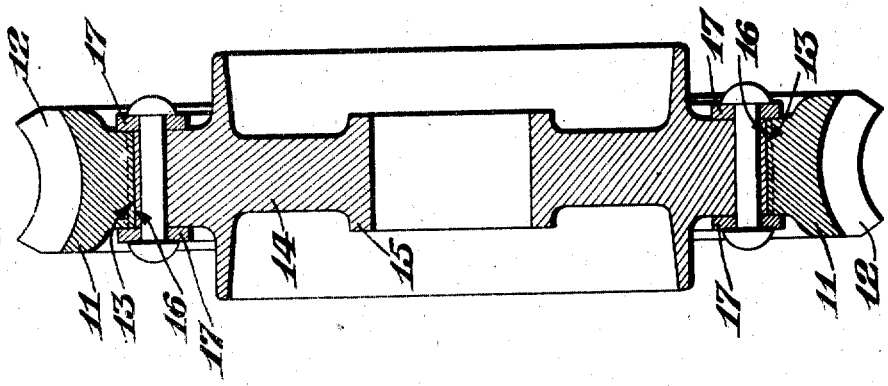
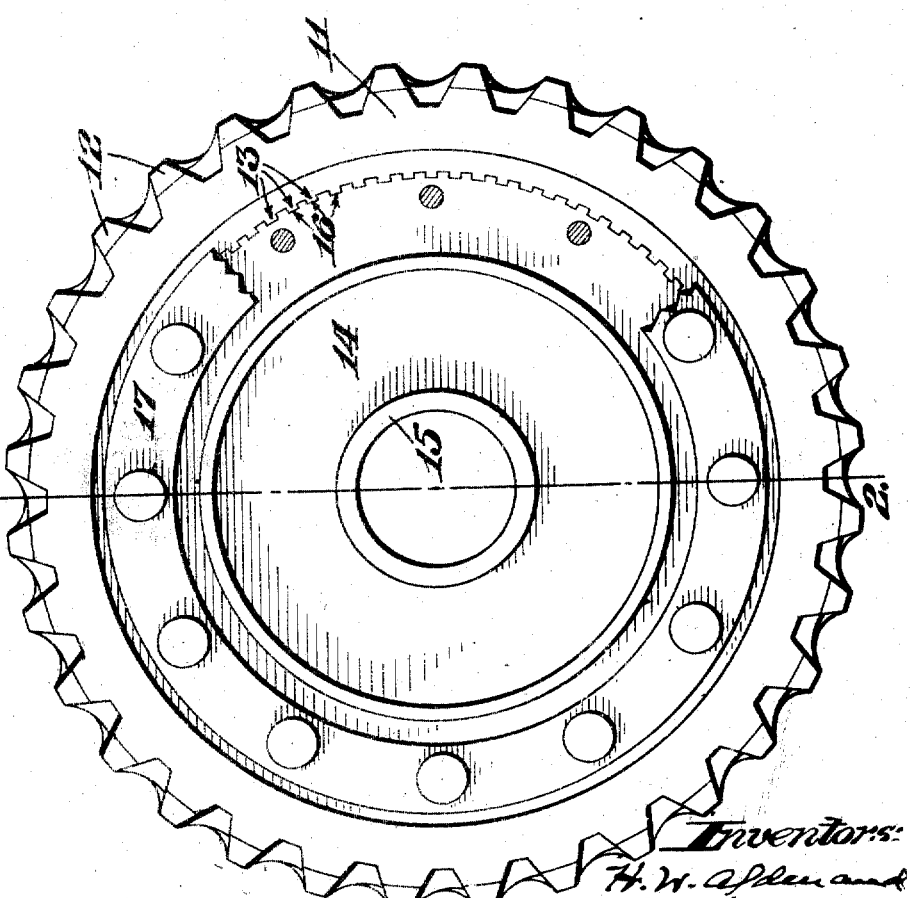

UNITED STATES PATENT OFFICE.

HERBERT W. ALDEN AND ROBERT B. WEAVER, OF DETROIT, MICHIGAN, ASSIGNORS TO THE TIMKEN-DETROIT AXLE COMPANY, OF DETROIT, MICHIGAN, A CORPORATION OF OHIO.

TOOTHED WHEEL.

1,231,321.  Specification of Letters Patent.  Patented June 26, 1917.

Application filed March 3, 1917. Serial No. 152,249.

*To all whom it may concern:*

Be it known that we, HERBERT W. ALDEN and ROBERT B. WEAVER, citizens of the United States, and residents of the city of Detroit, in the county of Wayne and State of Michigan, have invented a new and useful Improvement in Toothed Wheels, of which the following is a specification.

This invention relates to built-up toothed wheels, particularly gear wheels having iron or steel centers and bronze rims, such as are used for worm driving gearing for automobiles.

The objects of the invention are to secure a bronze toothed rim upon an iron or steel center so as to overcome the tendency of the rim to distort when heated by the friction of the driving worm and so as to be securely held under all conditions of use.

The invention consists in cutting a series of narrow shallow splines all the way around the internal circumference of the toothed rim, forming a series of internal teeth, and cutting grooves in the peripheral edge of the center forming teeth which mate with said splines. The invention further consists in shrinking or pressing the rim on to the center with the splines fitting in the grooves.

The invention further consists in securing the rim on the center by means of a ring or a pair of rings, each of which is riveted to the side of the rim or center so as to lap the ends of the splines and grooves, and prevent sidewise displacement of the rim on the center. The invention further consists in the details of construction of the rim and center as hereinafter described, reference being had to the accompanying drawings. What is claimed as the invention is set forth in the appended claims.

In the drawings, in which the same reference characters designate the same parts in each view, Figure 1 is a side view of a worm gear wheel embodying the invention, part of the securing ring being broken away to disclose the arrangement of mating splines and grooves;

Fig. 2 is a cross-section of the same on the line 2—2 in Fig. 1.

Worm gearing which transmits much power becomes heated from the considerable sliding friction constantly occurring between the worm and the wheel. The expansion of the rim by the heat generated is so much greater than the expansion of the center that if the rim is bolted to the center in the usual way, the bolts distort the rim and the gearing does not run as smoothly and quietly as is desired for automobile gearing. We have found that by making the rim of substantially the same diameter and shape around its entire inner perimeter and across its entire inner face, the effect of heating it is uniform expansion around the entire rim; and if the rim is equally free to expand everywhere there is no distortion caused thereby.

In the gear shown in the drawings, the rim 11 is made of bronze and provided with worm wheel teeth 12 spaced around its outer circumference. Upon the inner cylindrical face of the rim 11 is formed a series of parallel splines or shallow ribs 13 having parallel side faces spaced around its entire perimeter. Preferably the splines extend all the way across the inner face of the rim, as shown in the drawing, but it is not essential that they shall extend all the way across the face. The center 14 is cast or malleable iron, wrought iron or steel, and is provided with a hub 15 or other means of mounting it for rotation. The cylindrical circumference of the center 14 is formed with a series of parallel sided grooves 16 upon it mating with the ribs 13 on the rim. Preferably the rim is heated and slipped on the center, and as it contracts the ribs 13 slide radially in the grooves until the rim hugs the center uniformly all the way around it. Heating the rim is not essential, as it may be pressed on cold.

A pair of rings 17 is riveted one to each side of the center with the outer edges of each ring lapping the inner edge of the rim opposite the ends of the ribs 13, thereby preventing sidewise displacement of the rim and center but permitting radial expansion of the rim away from the center. Where the ribs and grooves do not extend all the way across the rim and center, only one ring 17 is necessary. A flange on the center or rim may be used instead of one of the rings 17, if preferred.

The invention is not restricted to worm gears nor to the exact shape and arrangement of the rim and center shown in the drawings.

We claim the following as our invention:

1. A composite wheel comprising a rim having a series of parallel internal teeth having flat substantially radial sides, a center having a series of external teeth mating with said internal teeth, and having flat sides fitting the flat sides of said internal teeth and being formed to permit uniform expansion of said rim independently of said center, and means for preventing sidewise displacement of said rim on said center without causing looseness of the rim on the center, said means permitting uniform radial movement of said rim toward and from said center.

2. A composite wheel comprising a rim having a series of shallow splines across its inner surface, a center having a series of grooves parallel to the axis of the wheel around its circumference mating with said splines, said mating grooves and splines having parallel side walls in contact with each other throughout their opposing faces respectively, and means for preventing sidewise displacement of said rim on said center, said means permitting uniform radial movement of said rim toward and from said center without causing looseness of the rim on the center.

3. A composite wheel comprising a rim part having a series of shallow splines upon its inner surface, a center part having a series of grooves parallel to the axis of the wheel around its circumference mating with said splines, said mating grooves and splines having parallel side walls respectively, and rings secured to the opposite sides of one part of said wheel concentrically with its axis, said rings lapping the ends of the splines and grooves and being free of the other part of said wheel to prevent sidewise movement and permit radial movement of said parts with respect to each other.

Signed at Detroit, Mich., this 27th day of February, 1917.

HERBERT W. ALDEN.
ROBERT B. WEAVER.